(12) United States Patent
Kruger et al.

(10) Patent No.: US 10,935,124 B2
(45) Date of Patent: Mar. 2, 2021

(54) CARRIER ASSEMBLY WITH OFFSET TRUNNION RIBS

(71) Applicant: Dana Automotive Systems Group, LLC, Maumee, OH (US)

(72) Inventors: Caleb S. Kruger, Delta, OH (US); Nathan D. Mandery, Perrysburg, OH (US); David S. Miller, Waterville, OH (US); Edwin O. Swinehart, Jr., Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 258 days.

(21) Appl. No.: 15/987,437

(22) Filed: May 23, 2018

(65) Prior Publication Data
US 2019/0360577 A1    Nov. 28, 2019

(51) Int. Cl.
| | |
|---|---|
| *F16H 57/03* | (2012.01) |
| *F16H 57/037* | (2012.01) |
| *F16H 57/031* | (2012.01) |
| *F16H 57/04* | (2010.01) |
| *B60K 17/16* | (2006.01) |
| *F16H 57/02* | (2012.01) |

(52) U.S. Cl.
CPC .......... *F16H 57/037* (2013.01); *F16H 57/03* (2013.01); *F16H 57/031* (2013.01); *F16H 57/0408* (2013.01); *B60K 17/16* (2013.01); *F16H 2057/02086* (2013.01); *F16H 2057/02091* (2013.01)

(58) Field of Classification Search
CPC ...... F16H 57/03; F16H 57/031; F16H 57/037; F16H 57/021; F16H 2057/02086; F16H 2057/02091; F16H 2057/02052; B60B 35/166
See application file for complete search history.

(56) References Cited

U.S. PATENT DOCUMENTS

| | | | |
|---|---|---|---|
| 8,464,611 B1 | 1/2013 | Chandler | |
| 9,500,272 B2 | 11/2016 | Elzib et al. | |
| 9,517,658 B2 | 12/2016 | Chung et al. | |
| 2004/0168543 A1 | 9/2004 | Huelsemann | |
| 2006/0094558 A1* | 5/2006 | Petruska | F16H 57/037 475/220 |
| 2015/0183318 A1 | 7/2015 | Bandy | |
| 2016/0033029 A1* | 2/2016 | Gerstenberger | F16H 57/037 475/160 |
| 2016/0167432 A1 | 6/2016 | Szczepanski | |
| 2018/0245681 A1* | 8/2018 | Newcomb | B33Y 10/00 |

* cited by examiner

*Primary Examiner* — Luis A Gonzalez
(74) *Attorney, Agent, or Firm* — Marshall & Melhorn, LLC

(57) ABSTRACT

A carrier assembly includes a first portion having a cover flange. A second portion is coupled with the cover flange. A first trunnion is coupled with the first portion, and a second trunnion coupled with the first portion opposite the first trunnion. A first trunnion rib is coupled with the first portion, wherein the first trunnion rib projects outward from the first portion. A second trunnion rib is coupled with the first portion, wherein the second trunnion rib projects outward from the first portion. The first and second trunnion ribs are offset from a trunnion centerline.

1 Claim, 7 Drawing Sheets

CARRIER ASSEMBLY WITH OFFSET TRUNNION RIBS

BACKGROUND

The present subject matter relates to carrier assemblies and the axle assemblies made therewith. An axle assembly may include a carrier assembly disposed between first and second wheel assemblies, wherein the carrier assembly is subject to substantial loads. A carrier assembly may also be utilized in vehicles having different pinion shaft angles.

In view of the above, there remains a need for a carrier assembly that can accommodate loads placed on the axle assembly while having minimal mass and size.

SUMMARY

In an embodiment, the present disclosure provides for a carrier assembly including a first portion having a cover flange, and a second portion coupled with the cover flange. A first trunnion is coupled with the carrier assembly first portion, and a second trunnion is coupled with the carrier assembly first portion opposite the first trunnion. The carrier assembly also includes a first trunnion rib coupled with the first portion, wherein the first trunnion rib projects outward from the first portion. A second trunnion rib is also coupled with the first portion, wherein the second trunnion rib projects outward from the first portion. The first and second trunnion ribs are offset from a trunnion centerline.

In another embodiment, the present disclosure provides for a carrier assembly including a first portion having a cover flange, and a second portion coupled with the cover flange. A first trunnion is coupled with the carrier assembly first portion, and a second trunnion is coupled with the carrier assembly first portion opposite the first trunnion. The carrier assembly also includes a first trunnion rib having a first end attached to the first trunnion, a second end attached to the second trunnion, and a middle portion disposed between the first and second ends. A second trunnion rib having a first end attached to the first trunnion, a second end attached to the second trunnion, and a middle portion disposed between the second trunnion rib first and second ends, wherein the first and second ends of the first and second trunnion ribs are offset from a trunnion centerline. Additionally, the first trunnion rib middle portion is disposed offset from the first trunnion rib first and second ends. The second trunnion rib middle portion may also be disposed offset from the second trunnion rib first and second ends opposite to the first trunnion rib middle portion.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure and do not illustrate all possible implementations thereof. The drawings are not intended to limit the scope of the present disclosure in any way.

DETAILED DESCRIPTION

Figure 1:
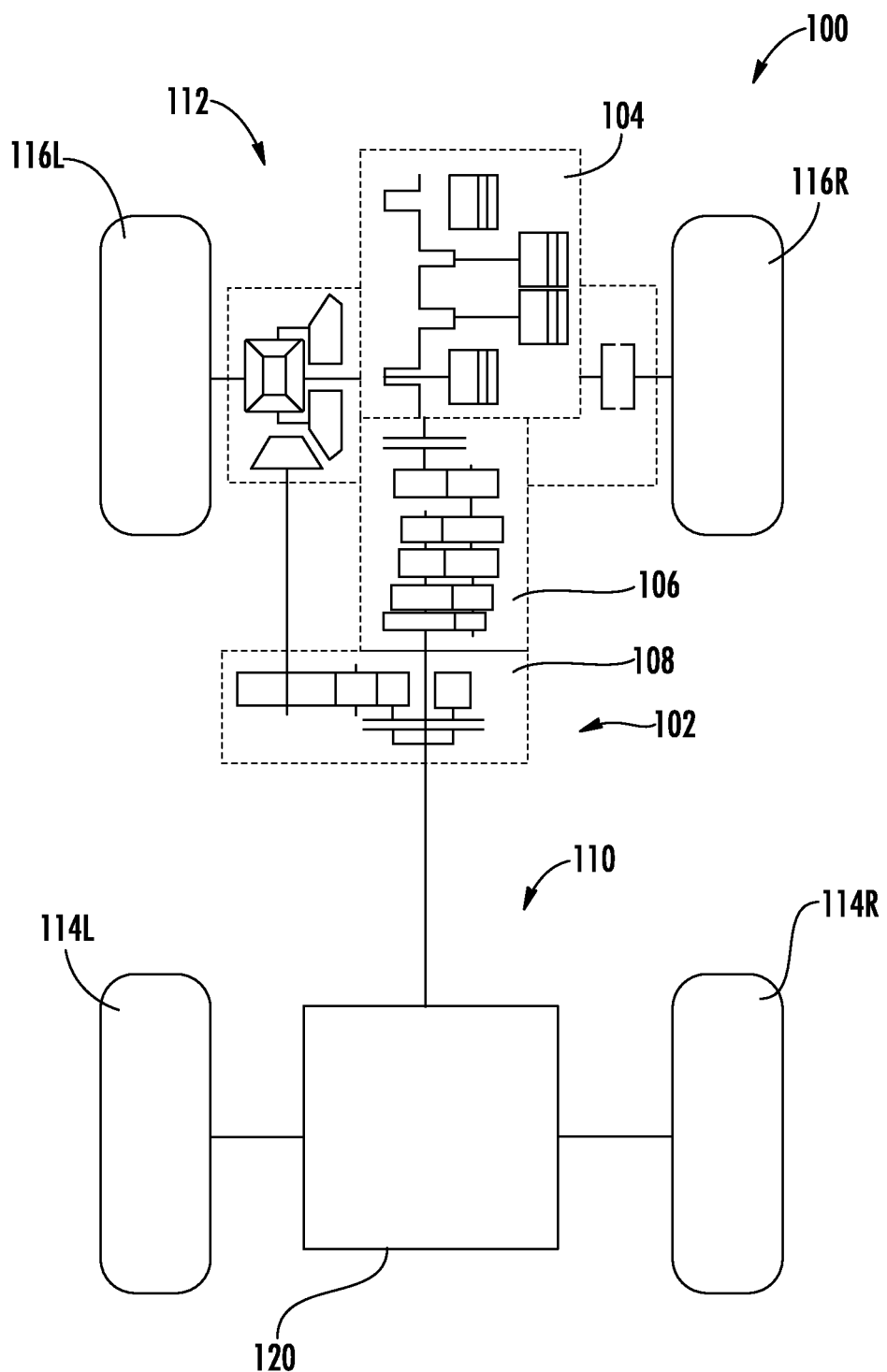
FIG. 1 is a schematic diagram of a portion of a powertrain according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

As illustrated in FIG. 1, a vehicle having a first axle assembly constructed in accordance with the teachings of the present disclosure is generally indicated by reference numeral 100. The vehicle 100 may comprise a powertrain 102 having all-wheel drive functionality. The powertrain 102 may include a power source 104 having an output driveably connected with a transmission 106 input. The power source 104 may be, but is not limited to, an internal combustion engine or an electric motor. In one embodiment, as illustrated in FIG. 1, the powertrain 102 may include a transfer case 108 driveably connected to an output of the transmission 106, a first axle assembly 110, and a second axle assembly 112. The first axle assembly 110 is driveably connected with the transmission 106 and continuously transmits torque from an engine 104 to a pair of rear wheel assemblies 114L, 114R. The second axle assembly 112 selectively transmits engine 104 torque to a pair of front wheels 116L, 116R via the transfer case 108. The front axle assembly 110 further includes a carrier assembly 120.

Figure 2:
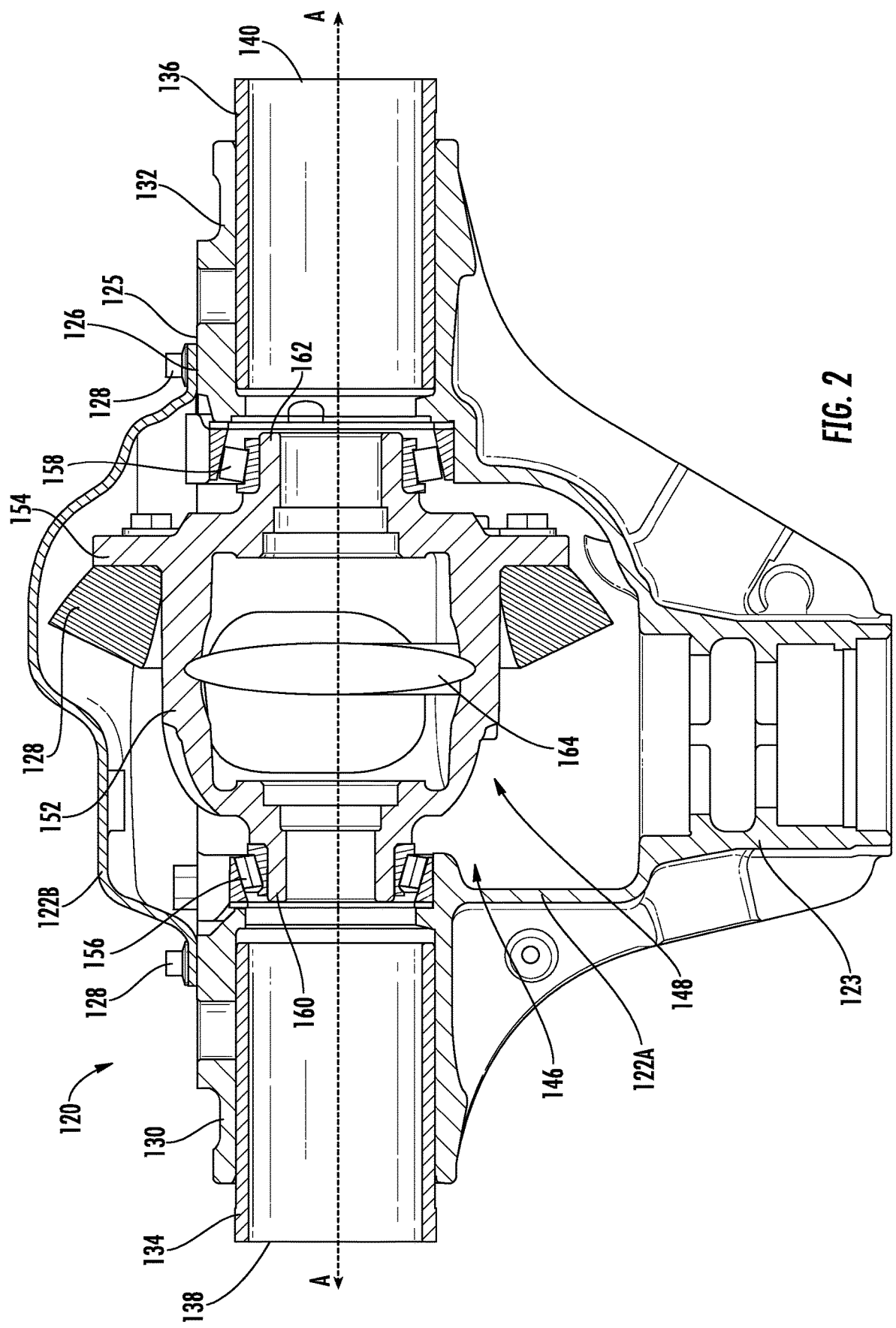
FIG. 2 is a cross-sectional view of carrier assembly according to an embodiment of the presently disclosed subject matter.

As illustrated in FIG. 2, in an embodiment, the carrier assembly 120 may comprise a first carrier portion 122A and a second carrier portion 122B. The first carrier portion 122A comprises a radially extending cover flange 124 (see FIGS. 3-7) having an engagement surface 125. The second carrier portion 122B includes a complimentary engagement surface 126. The first and second carrier portions 122A, 122B are coupled together at their complementary surfaces via mechanical fasteners 128.

A pinion shaft (not depicted) with a pinion gear (not depicted) coupled thereto are rotatably supported within the first carrier portion 122A, and receive torque from the power source 104. The first carrier portion 122A may comprise a pinion tube 123 in which the pinion shaft is rotatably supported via one or more bearings (not depicted). The pinion tube 123 is disposed on a forward portion of the first carrier portion 122A opposite the cover flange 124.

In an embodiment, the first carrier portion 122A comprises a first trunnion 130 and a second trunnion 132 disposed coaxially on opposite sides of the first carrier portion 122A. An axis AA shared by the first and second trunnions 130, 132 may be disposed generally transverse to an axis BB of the pinion tube 123. The axis AA may also be referred to as the trunnion centerline. A first axle tube 134 is located at least partially within the first trunnion 130 and is disposed coaxially therewith. A second axle tube 136 is located at least partially within the second trunnion 132 and is disposed coaxially therewith. In an embodiment, the first and second axle tubes 134, 136 may comprise a generally hollow cylindrical geometry. In another embodiment, the first and second axle tubes 134, 136 may comprise a generally hollow ractangular parallepiped geometry. The first and second axle tubes 134, 136 comprise opposed openings 138, 140, respectively. A first axle shaft (not depicted) is at least partially disposed through the first trunnion opening 138, and a second axle shaft (not depicted) is at least partially disposed through the second trunnion opening 140.

The first and second axle shafts are oriented generally transverse to the pinion shaft. Further, the first axle shaft may be coupled with the first wheel end assembly 114R at a first end, and coupled with a first differential side gear (not depicted) at a second end. The second axle shaft may also be coupled with the second wheel end assembly 114L at a first end thereof, and coupled with a second differential side gear (not depicted) at a second end thereof.

As illustrated in FIG. 2, the first and second carrier portions 122A, 122B may define a differential area 146. The differential area 146 may house a differential assembly 148. In an embodiment, the differential assembly 148 may comprise a ring gear 150 in meshing engagement with the pinion gear. The ring gear 150 may be coupled with a flange 154 of a differential case 152, such as through mechanical fasteners and/or welding.

The differential case 152 is mounted for rotation within the carrier assembly 120 via a pair of bearings 156, 158. The bearings 156, 158 are disposed about first and second trunnions 160, 162 on opposing portions of the differential case 152 for support thereof inside the carrier assembly 120. The pinion gear rotates the ring gear 150 and transfers torque to the differential case 152 thereby.

The differential case 152 has a hollow interior in which the first and second differential side gears are disposed. A spider shaft 164 may extend through the hollow interior of the differential case 152 and may be coupled at its ends with the differential case 152. A first pinion gear (not depicted) may be mounted on the first end of the spider shaft 164, and a second pinion gear (not depicted) may be mounted on the second end of the spider shaft 164. The first and second pinion gears are meshed with the first and second differential side gears. The second differential side gear is splined with the first axle shaft, and the first differential side gear may be splined with the second axle shaft.

Figure 3:
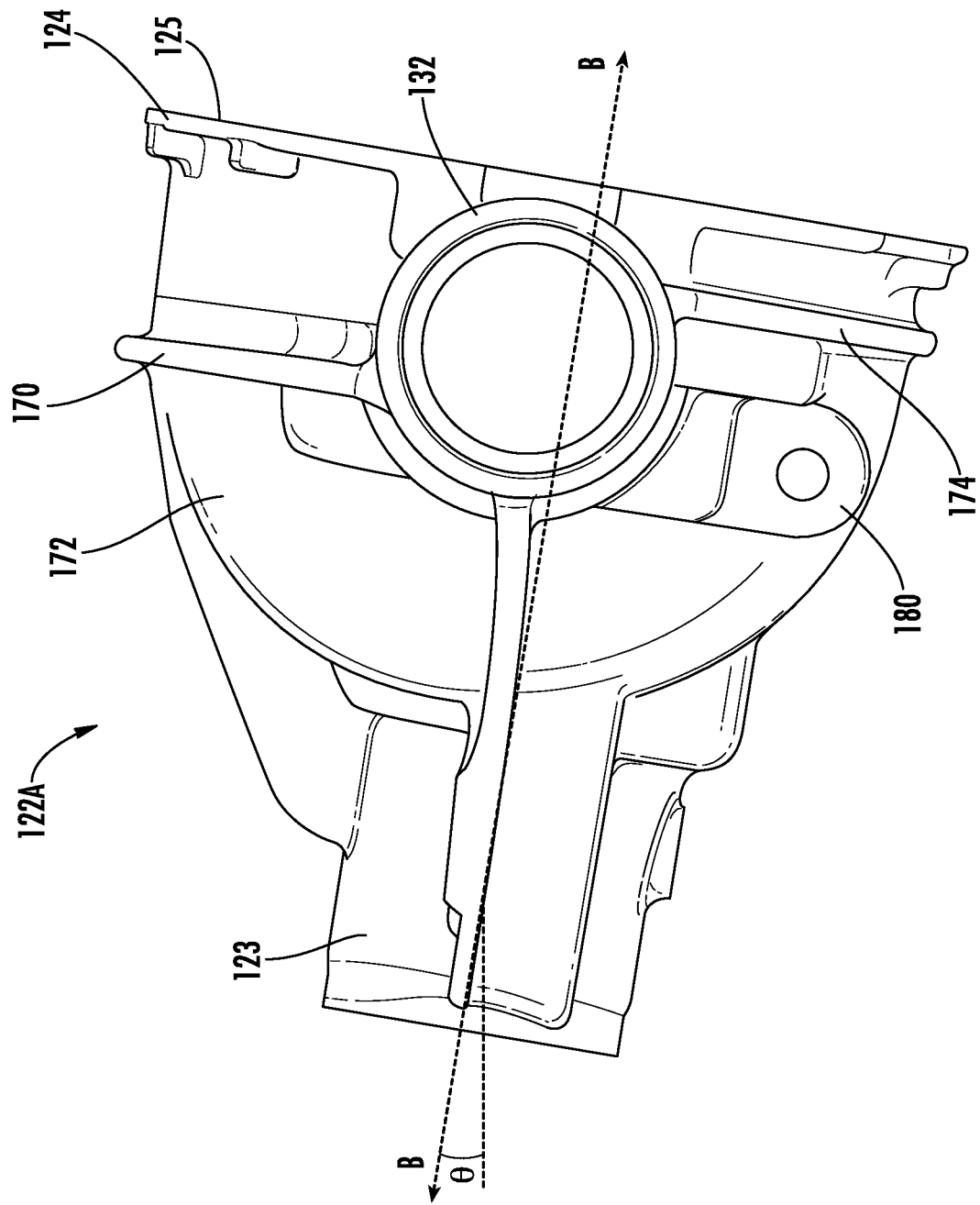
FIG. 3 is a side view of a portion of the carrier assembly of FIG. 2.
Figure 4:
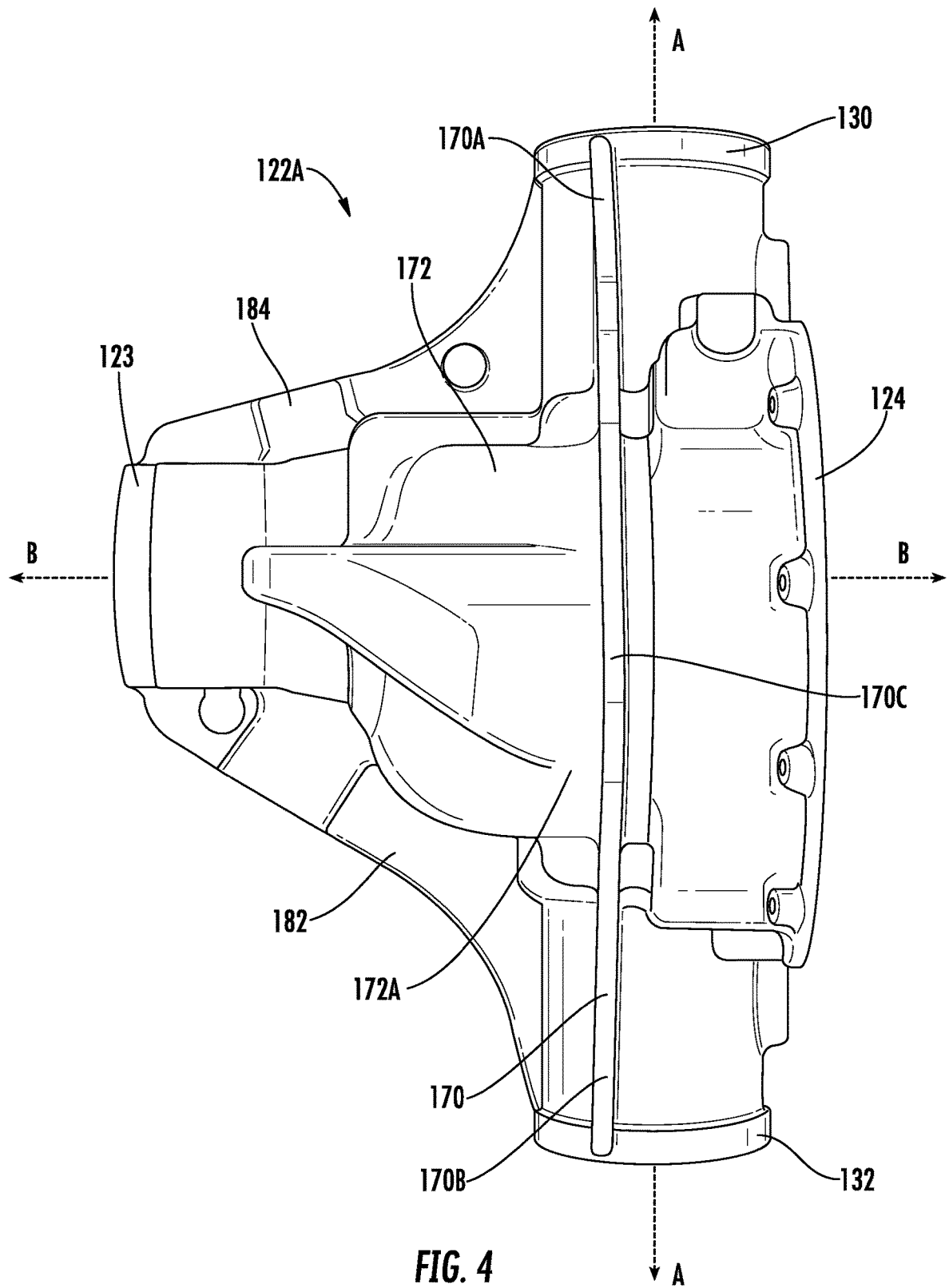
FIG. 4 is a top view of the portion of the carrier assembly of FIG. 3.

As illustrated in FIG. 3, in an embodiment, the carrier assembly 120 may be disposed such that the axis BB of the pinion tube 123 is oriented at an angle θ to a horizontal plane such as a roadway (not depicted). The carrier assembly pinion angle θ may be 0°-45°. In an embodiment, the pinion angle θ may be equal to 4°-5°. Further, the first carrier portion 122A may comprise a first trunnion rib 170 projecting outwardly from an outer surface 172 thereof. In an embodiment, the first trunnion rib 170 may project vertically from the first carrier portion outer surface 172. The first trunnion rib 170 may be disposed at a generally right angle to the axis BB. Additionally, the first trunnion rib 170 may be disposed offset from the trunnion axis AA toward the pinion tube 123. In an embodiment, as illustrated in FIGS. 3 and 4, the first trunnion rib 170 projects from a generally upper surface 172A of the first carrier portion 122A. The first carrier portion upper surface 172A is disposed above the axis BB.

Figure 5:
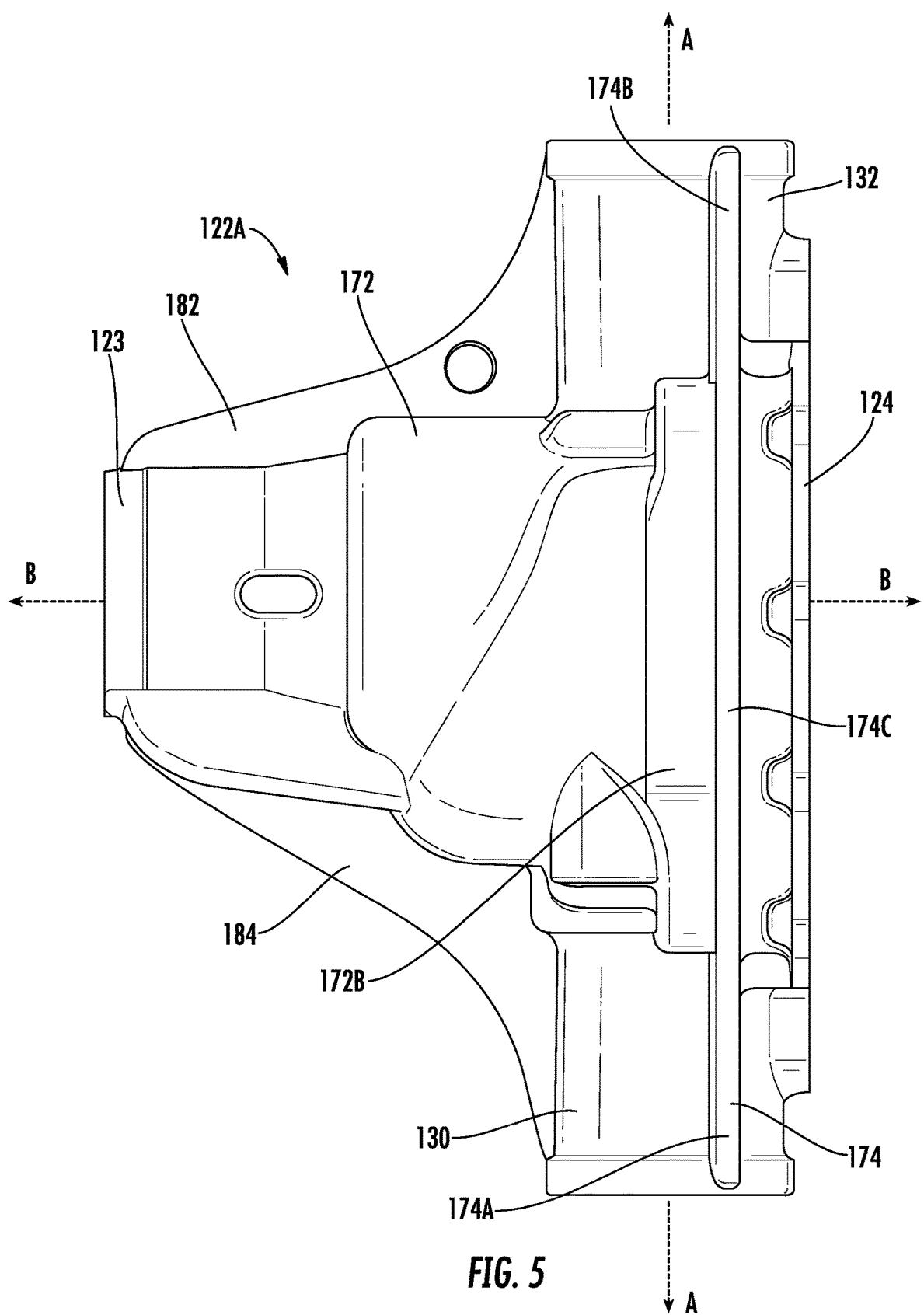
FIG. 5 is a bottom view of the portion of the carrier assembly of FIG. 3.

The first carrier portion 122A may also comprise a second trunnion rib 174 projecting outwardly from the first carrier portion outer surface 172. In an embodiment, the second trunnion rib 174 may project vertically from the first carrier portion outer surface 172. The second trunnion rib 174 may be disposed at a generally right angle to the axis BB. Further, the second trunnion rib 174 may be disposed offset from the trunnion axis AA toward the first carrier portion engagement surface 125. In an embodiment, the first and second trunnion ribs 170, 174 are disposed in a plane generally parallel with the first carrier portion engagement surface 125. In an embodiment, as illustrated in FIGS. 3 and 5, the first trunnion rib 170 projects from a generally lower surface 172B of the first carrier portion 122A. The first carrier portion lower surface 172B is disposed below the axis BB. Additionally, in the embodiment illustrated in FIG. 3, the second trunnion rib 174 is spaced apart from a drain boss 180. Spacing the second trunnion rib 174 away from the drain boss 180 greatly increases the fatigue life of the first carrier portion 122A in the area of the drain boss 180.

Figure 6:
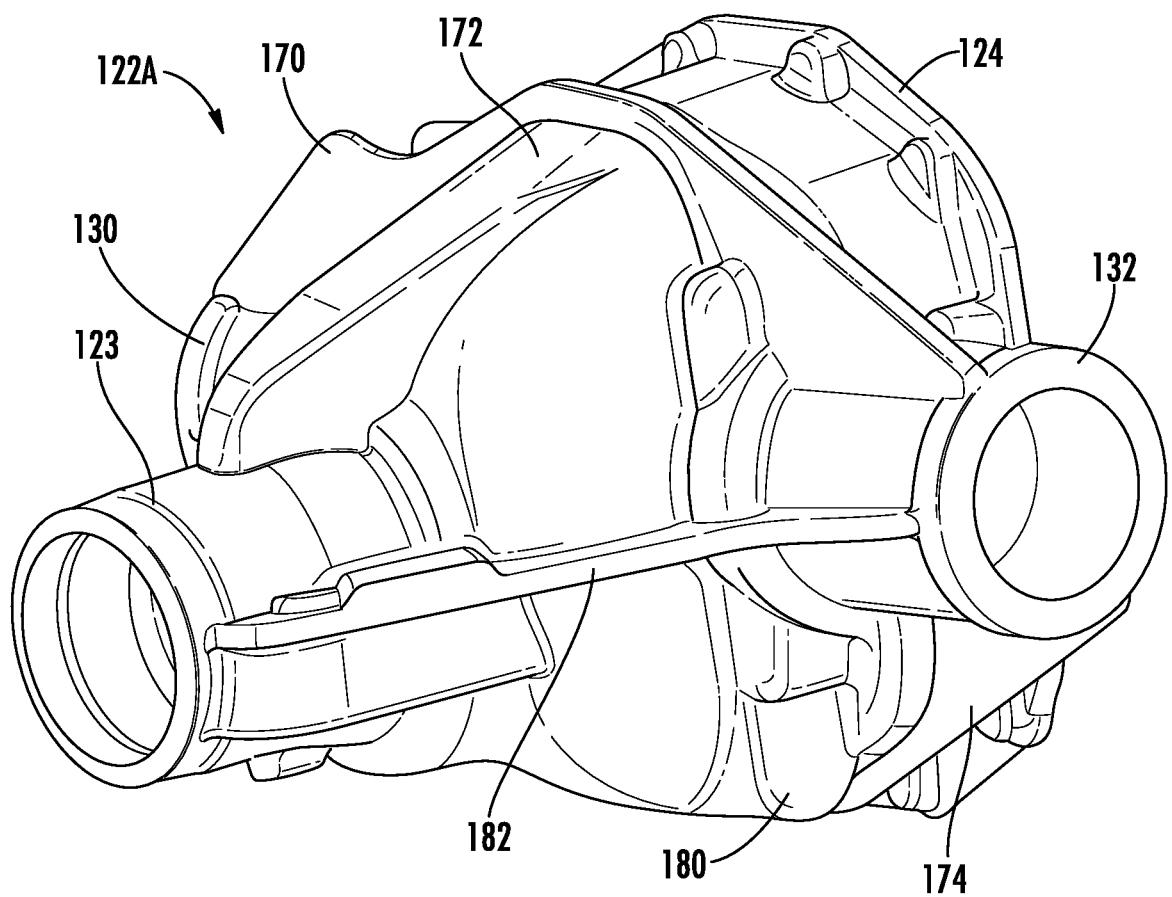
FIG. 6 is perspective view of the portion of the carrier assembly of FIG. 3.

As illustrated in FIG. 4, in an embodiment, the first trunnion rib 170 extends across the first carrier portion outer surface 172 from the first trunnion 130 to the second trunnion 132. In an embodiment, the first trunnion rib 170 may extend across an upper surface of the first carrier portion 122A to the axially outermost surface of each of the first and second trunnions 130, 132. In an embodiment, the first trunnion rib 170 may comprise a constant height from the first carrier portion outer surface 172 along its entire length. As illustrated in FIG. 6, in another embodiment, the first trunnion rib 170 may comprise a variable height relative to the first carrier portion outer surface 172 along the length of the first trunnion rib 170. Varying the height of the first trunnion rib 170 enables the first carrier portion 122A to support different load conditions. The first trunnion rib 170 may comprise a first end portion 170A connected to the first trunnion 130, a second end portion 170B connected to the second trunnion 132, and a third portion 170C disposed between the first and second end portions 170A, 170B. In an embodiment, the first trunnion rib first, second, and third portions 170A, 170B, 170C may be disposed in a single plane.

As illustrated in FIG. 5, in an embodiment, the second trunnion rib 174 extends across a lower surface of the first carrier portion 122A. In an embodiment, the second trunnion rib 174 may extend across the outer surface 172 to the axdially outermost surface of each of the first and second trunnions 130, 132. In an embodiment, the second trunnion rib 174 may comprise a constant height from the first carrier portion outer surface along the entire length of the seond trunnion rib 174. As illustrated in FIG. 6, in another embodiment, the second trunnion rib 174 may comprise a variable height relative to the first carrier portion outer surface 172. The second trunnion rib 174 may comprise a first end portion 174A connected to the first trunnion 130, a second end portion 174B connected to the second trunnion 132, and a third portion 174C disposed between the first and second end portions 174A, 174B. In an embodiment, the second trunnion rib first, second, and third portions 174A, 174B, 174C may be disposed in a single plane.

Figure 7:
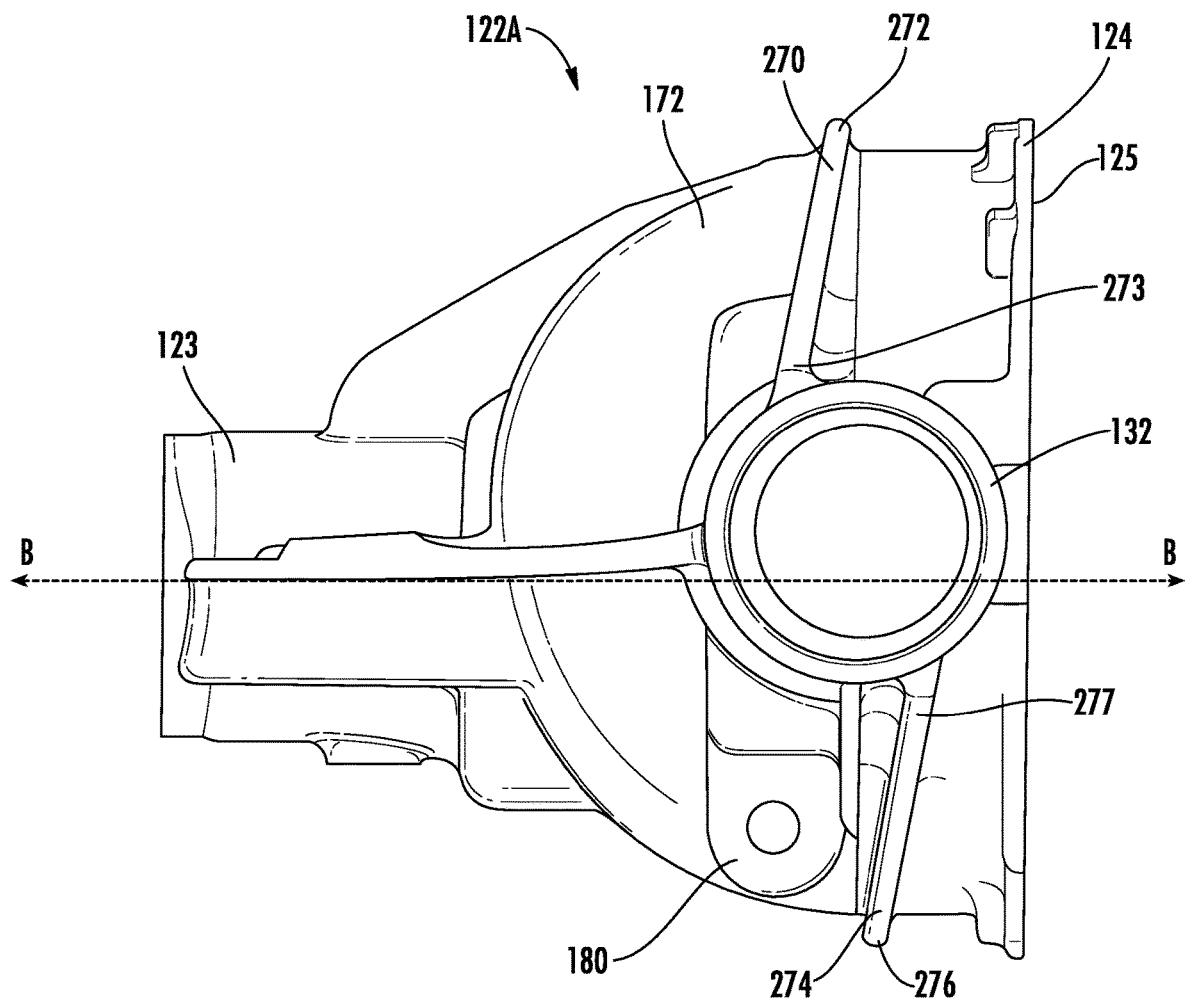
FIG. 7 is a side view of a portion of a carrier assembly according to an embodiment of the presently disclosed subject matter.

In an embodiment, as illustrated in FIG. 7, a first offset trunnion rib 270 may be disposed at an angle to a horizontal plane through the axis BB. The first trunnion rib 270 may be angled away from the pinion tube 123 at an angle θ. In other words, a mid-section 272 of the first trunnion rib 270 is disposed closer to the cover flange 124 than a first end section 273 and a second end section (not depicted) of the first trunnion rib 270. A second offset trunnion rib 274 may be disposed at an angle to the horizontal plane through the axis BB in the opposite direction of the first trunnion rib 270. The second trunnion rib 274 may be angled toward the pinion tube 123 at the angle θ. In other words, a mid-section 276 of the second trunnion rib 274 is disposed closer to the pinion tube 123 than a first end section 277 and a second end section (not depicted) of the second trunnion rib 274. This position of the first and second trunnion ribs 270, 274 locates the first and second trunnion ribs 270, 274 at least partially in a bending axis when the carrier assembly 120 is disposed at pinion tube angle θ, and when the carrier assembly 120 is disposed at a pinion tube angle of zero.

The carrier assembly 120 supports a portion of the mass of the vehicle 100. Because the carrier assembly 120 supports a portion of the vehicle mass, the carrier assembly 120 is subject to one or more loads. One load applied to the carrier assembly 120 is a load applied perpendicularly and vertical to the axis AA. By orienting the first and second trunnion ribs 170, 174 offset from trunnion axis AA as described above, the first and second trunnion ribs 170, 174 are located at least partially in the plane of the vertical load (i.e., in the bending axis) when the pinion tube 123 is disposed at the angle θ. Locating the first and second trunnion ribs 170, 174 at least partially within the plane of the vertical load as described above places more load on the first and second trunnion ribs 170, 174 thereby increasing the loading life cycle of the carrier assembly 120.

As illustrated in FIGS. 4-6, the first carrier portion 122A also includes a first pinion tube rib 182 which extends from the pinion tube 123 across the outer surface 172 of the first carrier portion 122A to the second trunnion 132. A second pinion tube rib 184 is disposed opposite the first pinion tube rib 182 and extends from the pinion tube 123 across the outer surface 172 of the first carrier portion 122A to the first trunnion 130.

The first and second trunnion ribs 170, 174 may be formed unitary and integral with the first carrier portion 122A. The first carrier portion 122A having the first and second trunnion ribs 170, 174 may be formed via, but is not limited to formation utilizing, sand casting, investment casting, die casting, lost foam casting, lost wax casting, and injecting molding. The first and second trunnion ribs 270, 274 may also be formed unitary and integral with the first carrier portion 122A via sand casting, investment casting, die casting, lost foam casting, lost wax casting, injecting molding, or machining.

While various embodiments have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative, not restrictive.

What is claimed is:

1. A carrier assembly, comprising:
   a first carrier portion having a longitudinal first axis;
   a first trunnion coupled with said first carrier portion;
   a second trunnion coupled with said first carrier portion opposite said first trunnion, wherein said first trunnion and said second trunnion have a common second axis;
   a first trunnion rib having a first end portion attached to said first trunnion, a second end portion attached to said second trunnion, and a third portion disposed between said first and second end portions;
   a second trunnion rib having a first end portion attached to said first trunnion, a second end portion attached to said second trunnion, and a third portion disposed between said second trunnion rib first and second end portions;
   wherein said first and second end portions of said first and second trunnion ribs are offset from said second axis along said first axis of the first carrier portion;
   wherein said third portion of said first trunnion rib is disposed offset from said first and second end portions of said first trunnion rib; and
   wherein said third portion of said second trunnion rib is disposed offset from said first and second end portions of said second trunnion rib in a direction opposite to said third portion of said first trunnion rib along said first axis of the first carrier portion.

* * * * *